(12) United States Patent
Lee et al.

(10) Patent No.: US 10,544,618 B2
(45) Date of Patent: Jan. 28, 2020

(54) CUTTING MACHINE FOR WINDOW COVERING

(71) Applicant: NIEN MADE ENTERPRISE CO., LTD., Taichung (TW)

(72) Inventors: Wen-Yeu Lee, Tainan (TW); Ching-Fang Yeh, Taichung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 53 days.

(21) Appl. No.: 15/868,286

(22) Filed: Jan. 11, 2018

(65) Prior Publication Data

US 2018/0135352 A1  May 17, 2018

Related U.S. Application Data

(63) Continuation-in-part of application No. 14/667,444, filed on Mar. 24, 2015, now Pat. No. 9,903,156.

(51) Int. Cl.
*E06B 9/266* (2006.01)
*B23D 23/00* (2006.01)
*B26D 1/08* (2006.01)

(52) U.S. Cl.
CPC .............. *E06B 9/266* (2013.01); *B23D 23/00* (2013.01); *B26D 1/085* (2013.01); *B23D 2023/005* (2013.01)

(58) Field of Classification Search
CPC .............. E06B 9/266; B23D 2023/005; B23D 8260/085; B26D 23/00; B26D 1/08; B26D 5/10; B26D 3/166; B26D 2007/013; B26D 7/04; B26D 3/16; B26D 2001/006; Y10T 83/7487; Y10T 83/885; Y10T 83/7567; Y10T 83/8854
USPC .... 83/167, 614, 613, 651, 697, 620; 30/316, 30/337, 343
See application file for complete search history.

(56) References Cited

U.S. PATENT DOCUMENTS

| | | | | |
|---|---|---|---|---|
| 2,539,232 | A * | 1/1951 | Dempster | A22C 7/00 83/646 |
| 3,269,239 | A * | 8/1966 | Dixon | A01G 2/30 83/140 |
| 4,932,301 | A * | 6/1990 | Buck | B26D 7/2614 83/640 |
| 6,435,066 | B1 | 8/2002 | Kutchmarek et al. | |
| 7,752,724 | B2 * | 7/2010 | Kollman | B23D 23/00 29/24.5 |
| 10,220,534 | B2 * | 3/2019 | Chen | B26D 1/085 |

(Continued)

*Primary Examiner* — Ghassem Alie
(74) *Attorney, Agent, or Firm* — Tracy M. Heims; Apex Juris, pllc.

(57) ABSTRACT

A cutting machine for cutting a window covering includes a machine base and a cutting device provided on the machined base. The machine base includes a sustaining face for putting the window covering thereon. The cutting device includes a frame provided on the machine base, a cutter, a movable block, a stopping block and a connecting bar. The control bar is pivoted on the frame and controllable to pivotally swing and drive the cutter to move up and down. The movable block is moved along with the cutter to drive the connecting bar to pivotally swing relative to the frame. The stopping block is adapted to abut against one end of the window covering to be cut and is further driven by the connecting bar to reciprocate along the machine base.

13 Claims, 14 Drawing Sheets

(56) References Cited

U.S. PATENT DOCUMENTS

2010/0089217 A1* 4/2010 Cheng .................... B23D 23/00
  83/631
2015/0020662 A1* 1/2015 Yamada ................... B26D 7/18
  83/111

* cited by examiner

CUTTING MACHINE FOR WINDOW COVERING

CROSS REFERENCE TO RELATED APPLICATIONS

This application is a continuation-in-part of U.S. patent application Ser. No. 14/667,444 filed on Mar. 24, 2015. The content of the above-referenced application is incorporated by reference herein.

BACKGROUND OF THE INVENTION

1. Technical Field

The present invention relates generally to a window covering, and more particularly to a cutting machine for cutting rails and window covering material of a window covering.

2. Description of Related Art

Typically, there are a variety of sizes of windows, so the manufactures sell the window coverings to retailers, and the retailers cut the window covering to fit a specific window. A conventional cutting machine for cutting a window covering is taught in U.S. Pat. No. 6,435,066 (hereafter the '066 patent), titled "Cutting apparatus for window covering and methods therefor", which provides a cutting device on a machine base to cut the window covering.

The '066 patent teaches that a blade, which is used to cut the window coverings, has to simultaneously touch the headrail, the bottom rail, and the window covering material before cutting. However, when the cutting machine of the '066 patent is used to cut a blind with a cellular shade or slats, it would have an uneven cutting result when the blinds are not pressed enough. Therefore, the key to have a nice cutting result is how to firmly press the blinds. However, the clamping device of the '066 patent can't provide sufficient clamping force. On the contrary, if power of the clamping device is too large, it might damage some slats of the blinds.

Furthermore, the '066 patent teaches that the blade simultaneously touches the headrail, the bottom rail, and the window covering material before cutting. It makes the user have to exert a large strength to cut the window coverings, and sometime it will damage the elements with such large strength. Besides, the '066 patent provides a rigid machine base to sustain the window coverings that would damage the blade after the blade cutting the window coverings several times, and that is bad to the afterwards cutting tasks.

BRIEF SUMMARY OF THE INVENTION

The objective of the present invention directs to a cutting machine for a window covering, which could evenly cut the window covering with a good cutting quality.

In order to achieve the objective of the present invention, the present invention provides a cutting machine for cutting a window covering. The cutting machine includes a machine base and a cutting device provided on the machined base. Wherein, the machine base includes a sustaining face for putting the window covering thereon. The cutting device includes a frame, a cutter, a movable block, a stopping block and a connecting bar. The frame is provided on the machine base. The cutter is movably disposed in the frame. The control bar is pivoted on the frame and is controllable to pivotally swing between a first position and a second position. The cutter is adapted to be moved up and down as being driven by the control bar. The movable block is provided to be moved along with the cutter between a third position and a fourth position when the control bar pivotally swings between the first position and the second position. The stopping block is movably provided on the machine base, and adapted to abut against one end of the window covering to be cut. The connecting bar is pivotally connected to the frame and adapted to be pivotally swung relative to the frame as being moved by the movable block. The stopping block is adapted to be driven by the connecting bar to reciprocate along the machine base. The stopping block is driven to move toward the cutter by the connecting bar while the movable block is being moved to the third position. On the contrary, the stopping block is driven to move away from the cutter by the connecting bar while the movable block is being moved to the fourth position.

In one embodiment, the cutting device further includes a bar which is disposed corresponding to the sustaining face. The stopping block is movably mounted on the bar. One end of the bar is pivotally connected to the connecting bar, while another end of the bar extends toward a direction away from the sustaining face and passes through a fixed block protruding from the machine base. The connecting bar drives the bar to reciprocate relative to the fixed block, which makes the stopping block reciprocate along with the bar along the machine base when the connecting bar is driven by the movable block to pivotally swing.

In one embodiment, the connecting bar is pivotally connected to the frame and is adapted to be pivotally swung relative to the frame as being driven by the movable block.

In one embodiment, the cutting device further includes a knob adapted to fix the stopping block at a desired position on the at least one bar.

In one embodiment, the cutting device further includes a positioning post and a locker. The positioning post is fixed to the frame and the locker pivots to the control bar and includes a hook. When the control bar is at the first position, the hook of the locker could engage the positioning post. When the hook of the locker disengages from the positioning post, the control bar could be operated to pivotally swing to the second position.

In one embodiment, the cutting device further includes a stopping member fixed on the locker and adapted to separate the hook of the locker from the control bar.

In one embodiment, the hook of the locker includes a round edge. When the control bar approaches the first position while being moved from the second position to the first position, the round edge of the hook abuts against the positioning post to move the locker off, and then the locker automatically moves back to engage the positioning post because of gravity.

In one embodiment, the connecting bar includes an elongated slot. The movable block has a portion received in the elongated slot to be moved along the elongated slot between the third position and the fourth position.

In one embodiment, the elongated slot is oblique to an axial line, which is perpendicular to the sustaining face.

In one embodiment, the connecting bar is pivotally connected to a rigid board of the machine base and adapted to be pivotally swung relative to the rigid board as being driven by the movable block.

In one embodiment, the cutting device further includes another movable block and a movable bar, wherein the another movable block moves along with the cutter, and is pivotally connected to one end of the movable bar, while another end of the movable bar is pivotally connected to the movable block; the movable block has a portion received in an elongated slot of the connecting bar to be moved along the elongated slot between the third position and the fourth position.

In one embodiment, the cutting device further includes a knob adapted to fix the stopping block at a desired position on the bar.

In one embodiment, the elongated slot is oblique to a longitudinal direction of the bar.

With the design of above, the cutting machine of the present invention could provide a nice cutting task. The present invention further provides several functions, including safe operation, automatically collecting the waste parts of the window covering after being cut, and elongating the life of the cutter.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
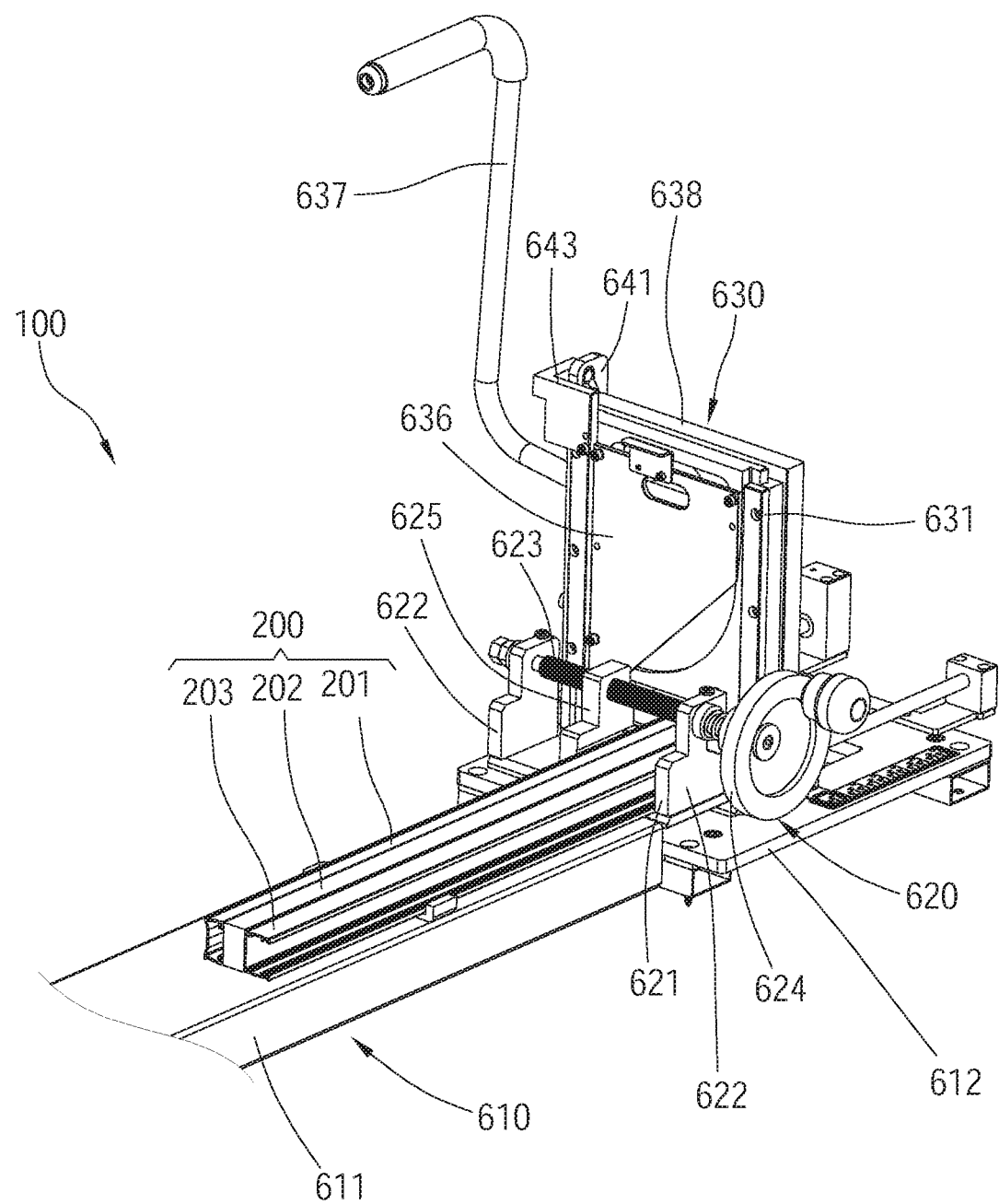
FIG. 1 is a perspective view of a preferred embodiment of the present invention.
Figure 2:
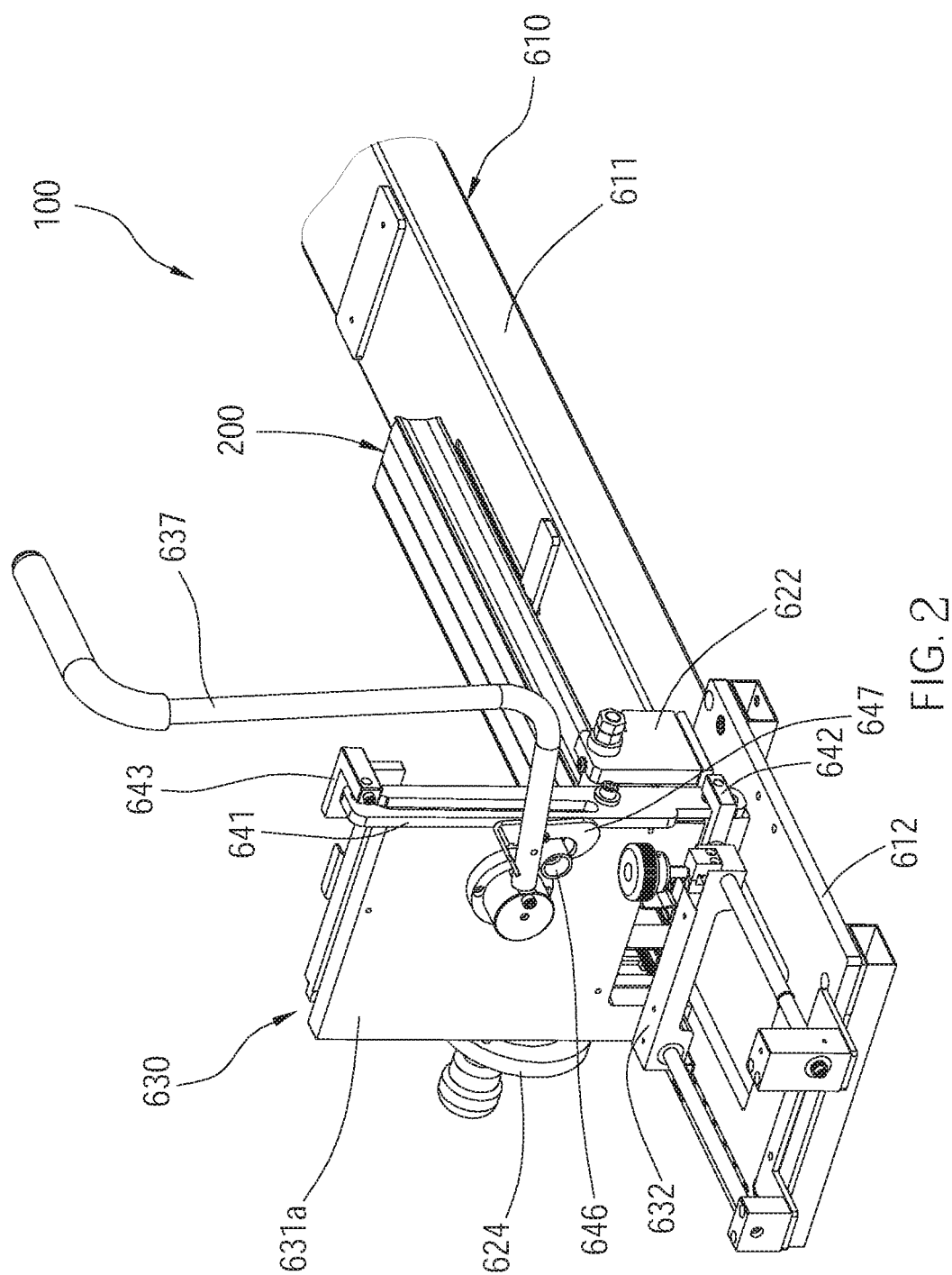
FIG. 2 is another perspective view of the preferred embodiment of the present application.

As shown in FIG. 1 and FIG. 2, a cutting machine 100 of the preferred embodiment of the present invention is used to cut a window covering including a first rail 201, a covering material 202, and a second rail 203. The covering material could be a cellular shade or slats, and the first rail 201 could be a headrail of the covering material 202 while the second rail 203 is a bottom rail, or reverse. The cutting machine 100 includes a machine base 610, a clamping device 620, and a cutting device 630.

As shown in FIGS. from FIG. 3 to FIG. 6, the machine base includes a main rail 611, a rigid board 612, a non-rigid pad 613, and a guiding board 614. The main rail 611 and the rigid board 612 are connected together for the window covering to stably rest thereon. The rigid board 612 has an elongated cutting slot 612a (FIG. 6) and a discharging opening 612b next to the cutting slot 612a. The non-rigid pad 613 is fixed to the rigid board 612, and has a flat sustaining face 613a on a top side thereof to sustain the window covering 200. The guiding board 614 is fixed to the rigid board 612 in an oblique direction, and has a guiding surface 614a which slopes towards the discharging opening 612b. The cutting slot 612a of the rigid board 612 is between the non-rigid pad 613 and the guiding board 614, and the discharging opening 612b is lower than the sustaining face 613a of the non-rigid pad 613.

Figure 5:
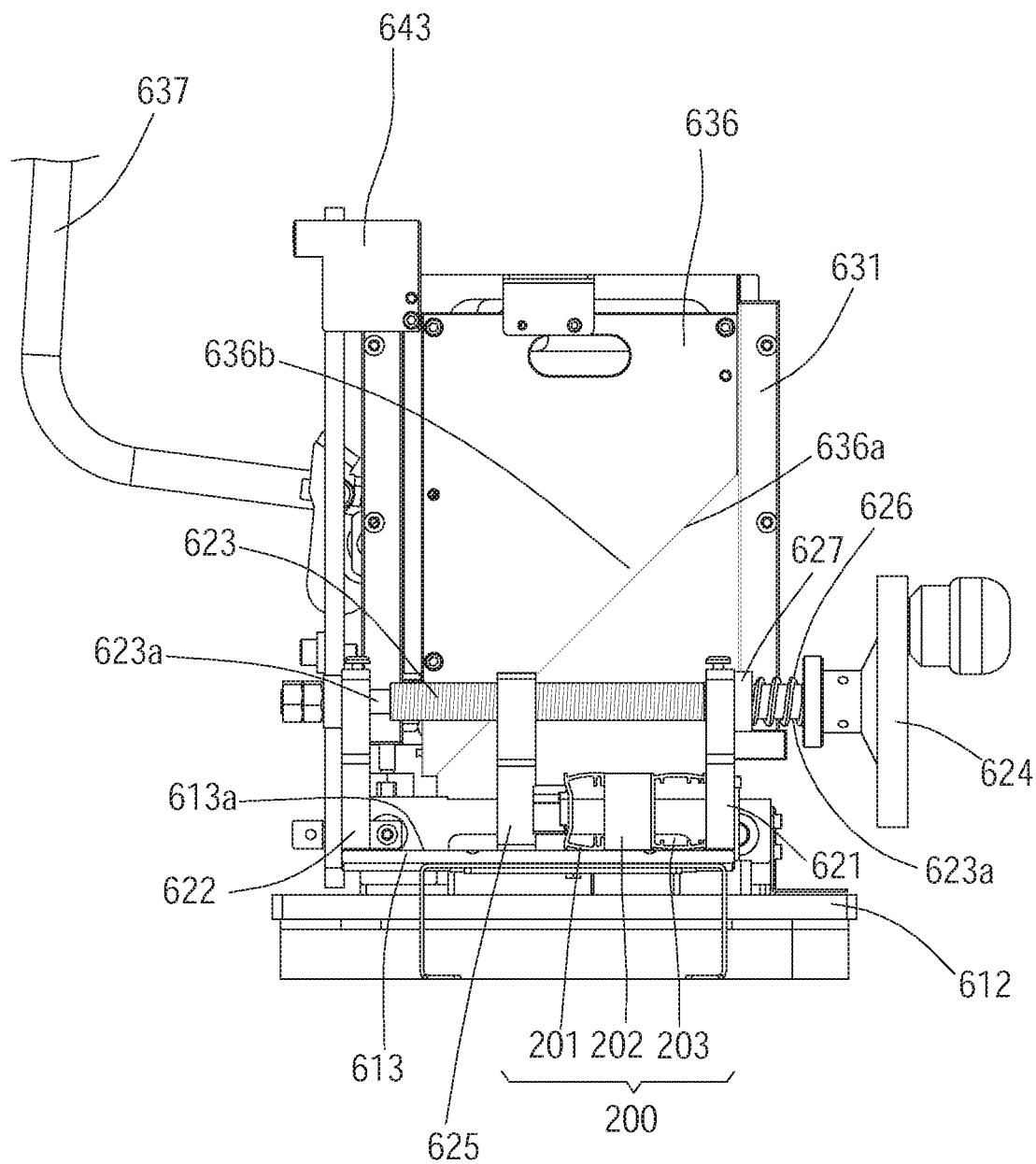
FIG. 5 is a rear view of FIG. 3.

As shown in FIG. 5, the clamping device 620 is mounted on the machine base 610 to firmly hold the window covering 200 for the cutting operation. The clamping device 620 includes two fixed bases 621, 622, a screw rod 623, an operating wheel 624, and a clamping block 625. The fixed bases 621, 622 are fixed to the machine base 610, and keep a distance from each other. The screw rod 623 has two round sections 623a passing through the fixed bases 621, 622 respectively, so that the screw rod 623 is able to move in an axial direction and rotate. The operating wheel 624 is connected to an end of the screw rod 623 to be operated by a user to rotate the screw rod 623 in both directions. The clamping block 625 is provided with a threaded hole (not shown) to be meshed with a thread section, which is between the round sections 623a, of the screw rod 623. Therefore, when the operating wheel 624 is turned, the clamping block 625 moves on the screw rod 623 between the fixed bases 621, 622. The window covering 200 is place in a space between the clamping block 625 and the fixed base 621 to be clamped by turning the operating wheel 624. It is noted that while the operating wheel 624 is being overturned, the screw rod 623 is moving toward the fixed base 622 instead of the clamping block 625 that could limit the pressure on the window covering 200.

Figure 7:
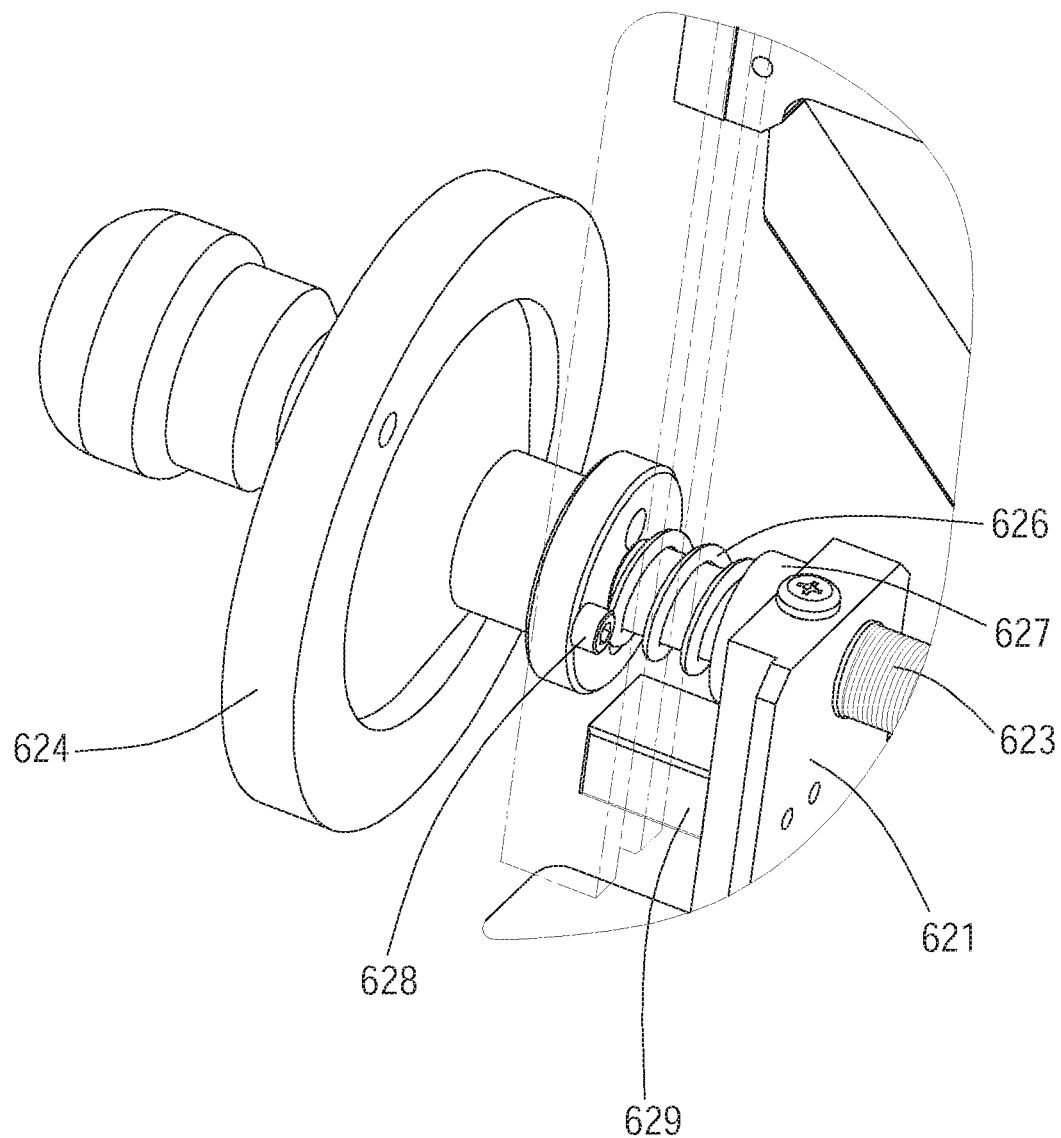
FIG. 7 is a partial perspective view of the preferred embodiment of the present invention, showing the relative positions between the first stopping block and the second stopping block.

The clamping device 620 further includes a spring 626, a hub 627, a first stopping block 628, and a second stopping block 629. The spring 626 and the hub 627 fit the round section 623a of the screw rod 623, the hub 627 abuts against the fixed base 621, and the spring 626 has opposite ends urging the hub 627 and the operating wheel 624 respectively. As shown in FIG. 7, the first stopping block 628 is fixed to the operating wheel 624 to move together with the operating wheel 624. The second stopping block 629 is fixed to the fixed base 621. While the operating wheel 624 keeps being turned, the screw rod 623 is moved toward the fixed base 622 until the first stopping block 628 abuts against the second stopping block 629 that results in the operating wheel 624 not being turned anymore. At the same time, the spring 626 urges the operating wheel 624 in a direction opposite to that of the screw rod 623 to hold the clamping block 625 at a position which may firmly press the window covering 200. As a result, the clamping device 620 would provide the window covering a suitable and consistent pressure which is benefit to the following cutting operation, and would not damage the window covering 200.

The cutting device 630 is mounted on the rigid board 612 of the machine base 610 and adjacent to the clamping device 620 which has several functions, including cutting the window covering 20 in a safe way, blocking the window covering, and discharging the window covering. The detail of the cutting device 630 is hereafter.

Figure 3:
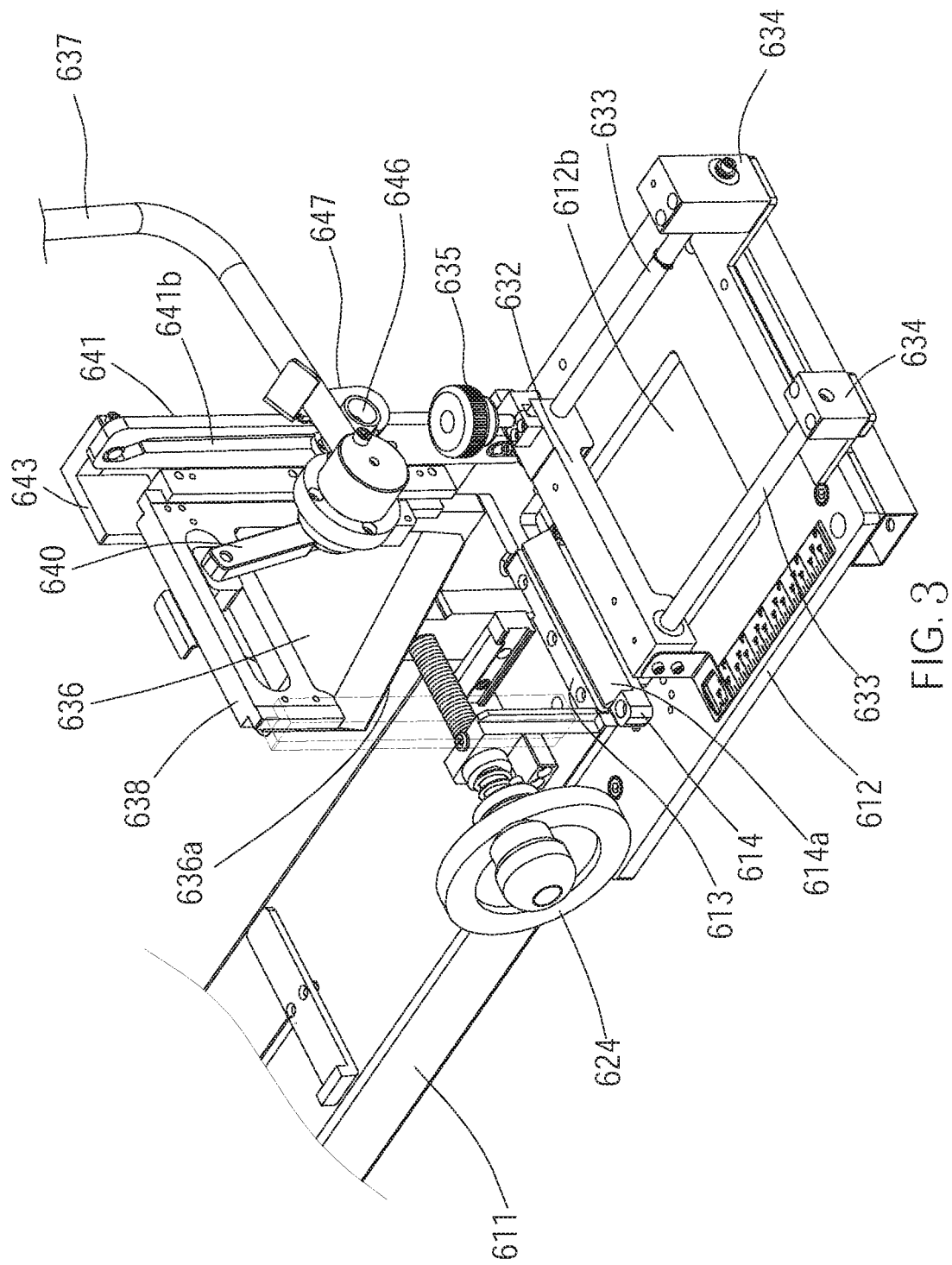
FIG. 3 is a partial perspective view of the preferred embodiment of the present application.
Figure 4:
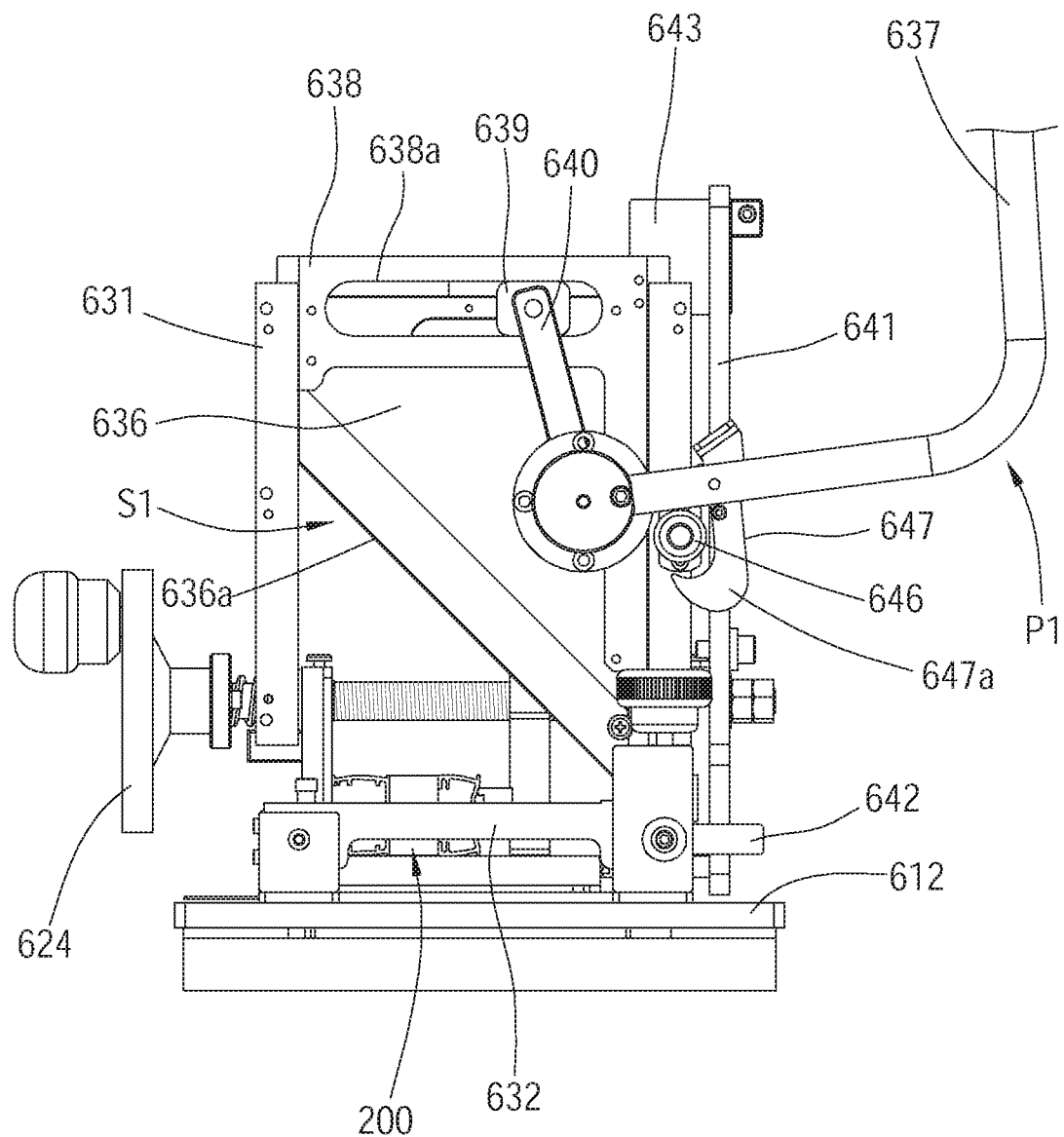
FIG. 4 is a front view of FIG. 3, showing the control bar at the first position and the cutter at the pre-cut position.

The cutting device 630 includes a frame 631 and a stopping block 632. The frame 631 is vertically mounted on the rigid board 612 and between the clamping device 620 and the stopping block 632. As shown in FIG. 3, the stopping block 632 is fixed to two bars 633, and each of the bars 633 pass through a fixed block 634 to reciprocate the stopping block 632 along the machine base 610 and relative to the frame 631. An end of the window covering 200 abuts against the stopping block 632 for the following cutting operation. The cutting device 630 further includes a fastener 635 adapted to fix the stopping block at a desired position on the two bars. For example, a fastener 635, such as a knob 635 is provided to be operated to lock and unlock the stopping block 632 that could move and position the stopping block 632 at any desired position on the bars 633. It controls a length of the window covering 200 to be cut.

Figure 8:
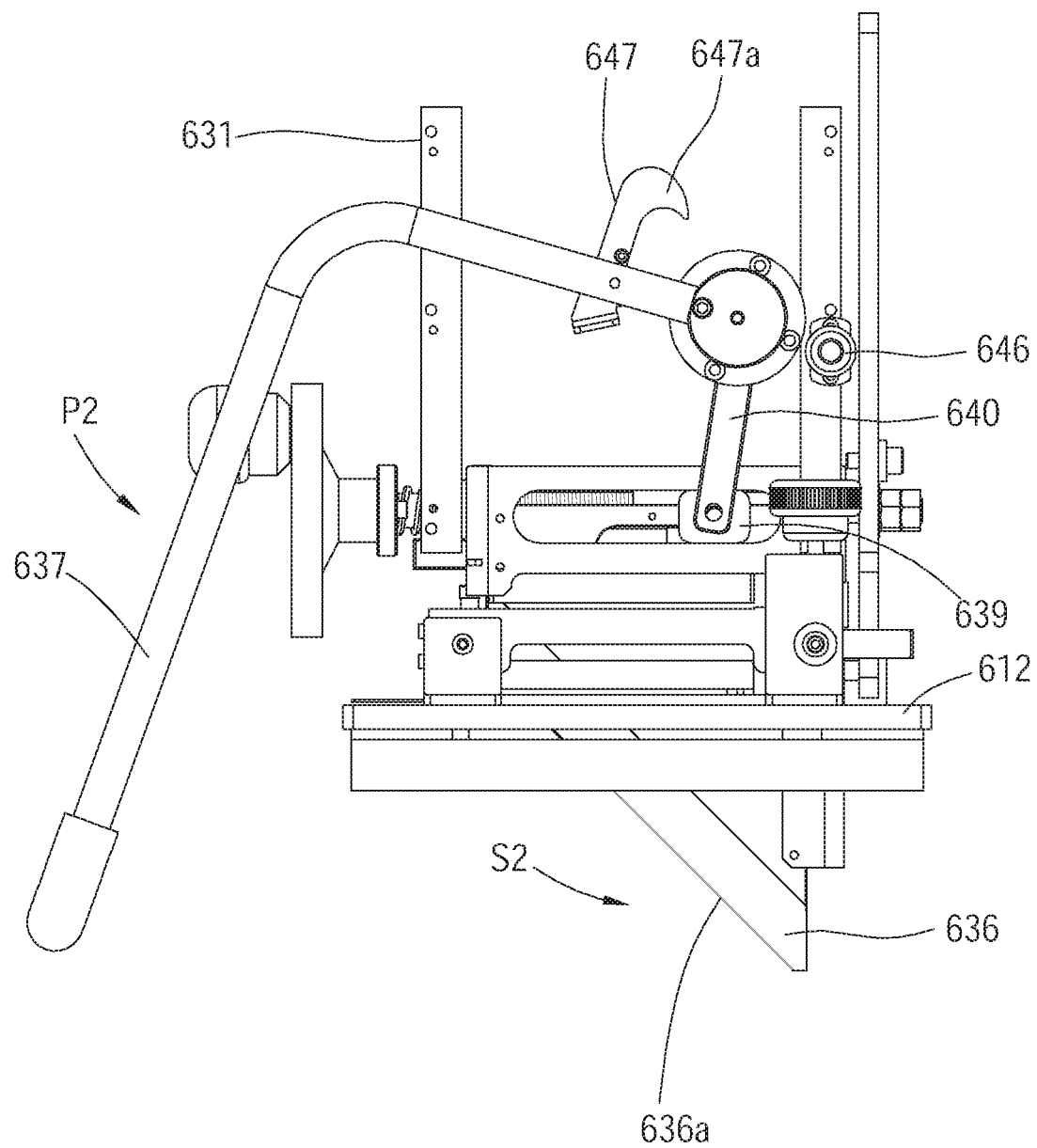
FIG. 8 is a front view of FIG. 3, showing the control bar at the second position and the cutter at the post-cut position.

As shown in FIGS. from FIG. 1 to FIG. 8, the cutting device 630 further includes a cutter 636 and a control bar 637. The cutter 636 is fixed to a guiding block 638, and the guiding block 638 engages the frame 631 for reciprocation. The guiding block 638 has a transverse guiding slot 638a, in which a sliding block 639 is received for reciprocation. The control bar 637 has an end pivoted on a back board 631a of the frame 631, and connected to a linkage 640, which has an end pivoted on the sliding block 639. The control bar 637 is operated to be swung between a first position P1 (FIG. 4) and a second position P2 (FIG. 8) to move the sliding block 639 along the guiding slot 638a, so as to move the cutter 636 in a vertical direction between a pre-cut position S1 (FIG. 4) and a post-cut position S2 (FIG. 8). In order to have a clear showing of the elements of the present invention, the back board 631a is omitted in some drawings The cutter 636 has a blade edge 636a and a body 636b. The blade edge 636a is oblique to the sustaining face 613a, and an angle between the blade edge 636a of the cutter 636 and the sustaining face 613a is between 0 and 90 degrees. The angle of the blade edge 636a of the cutter 636 is determined by the window covering 200 to be cut. A preferable angle between the blade edge 636a of the cutter 636 and the sustaining face 613a is 45 degrees. While the cutter 636 is being moved from the pre-cut position S1 to the postcut position S2, the first rail 201, the covering material 202, and the second rail 203 of the window covering 200 are cut by the blade edge 636a in sequence. As a result, the window covering 200 is cut in an easy way when the cutter 636 is moved to the post-cut position S2 from the pre-cut position S1. Besides, in order to ensure the cutting quality, the cutter 636 is parallel to an edge of the non-rigid pad 613, and is very close to the edge when the cutter 636 arrives at the post-cut position S2 to provide the window covering a strong support. While the blade edge 636a of the cutter 636 passes through the cutting slot 612a, the body 636b would abut against the edge of the non-rigid pad 613 that makes the window covering 200 have a flat cutting facet. Sometime, the cutter 636 might cut the sustaining face 613a of the non-rigid pad 613 if the cutter 636 is tilted. The property of the non-rigid pad 613 would protect the blade edge 636a from being damaged. In the present invention, the non-rigid pad 613 is made of reinforced plastics, which is softer than the blade edge 636a of the cutter 636. In practice, any material softer than the blade edge 636a could be selected to be the non-rigid pad 613.

Figure 6:
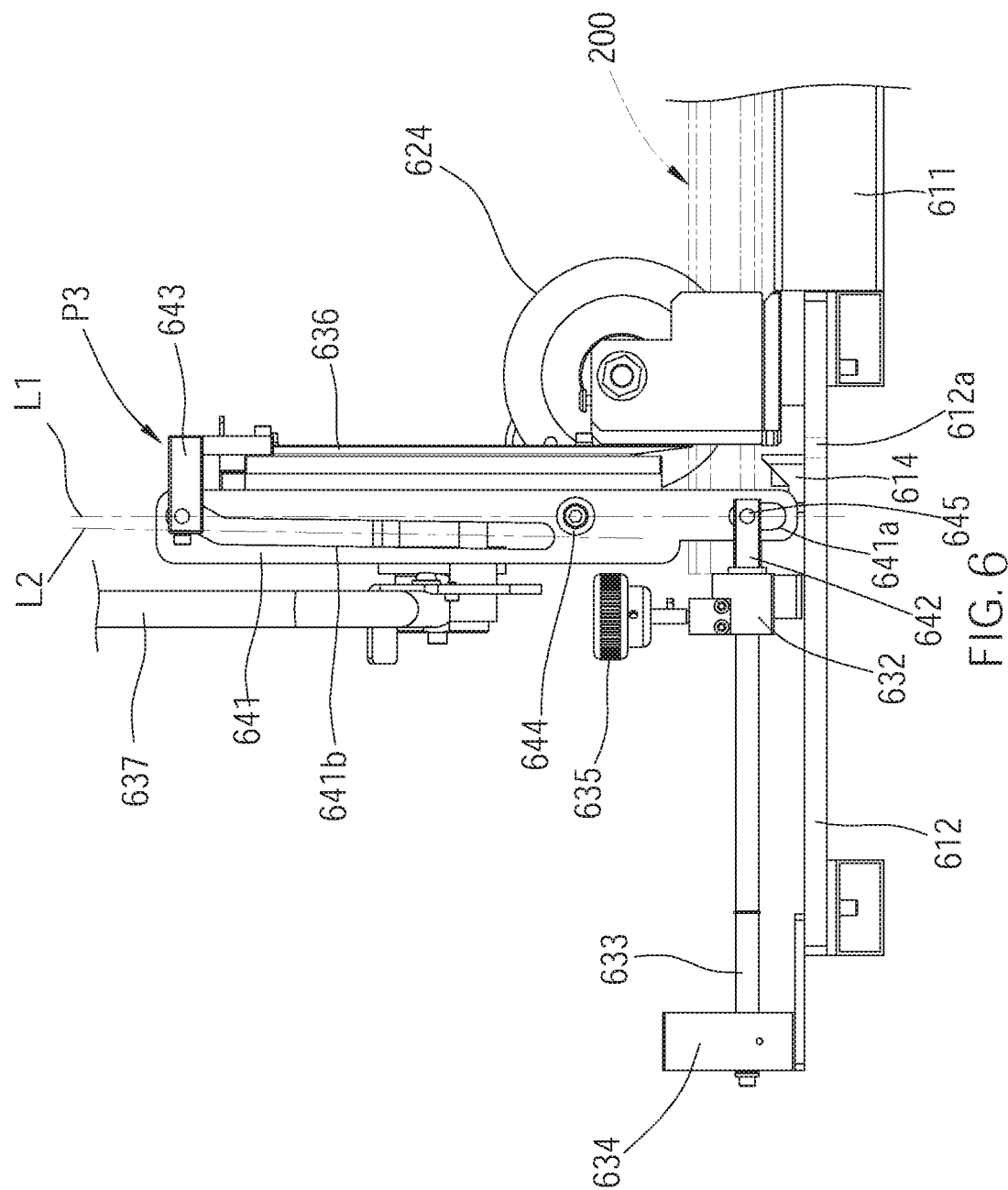
FIG. 6 is a right view of FIG. 3, showing the movable block at the third position.

As shown in FIG. 1 and FIG. 6, the cutting device 630 further includes a connecting bar 641, a connecting block 642, and a movable block 643. The connecting bar 641 is pivotally connected to the frame 631 by a pin 644. The connecting block 642 has an end fixed to the bar 633. A rod 645 is transversely connected to the connecting block 642, and engages a slot 641a of the connecting bar 641. Since the stopping blocks 632 are fixed to the bars 633, the connecting bar 641 is linked to the stopping blocks 632 through the connecting block 642. The connecting bar 641 further has an elongated slot 641b. An axial line L1 and a central line L2 are defined here, wherein the axial line L1 is an imaginary line perpendicular to the sustaining face 613a, and the central line L2 is an imaginary line passing through a long axis of the elongated slot 641b. The central line L2 of the elongated slot 641b is oblique to the axial line L1. In other words, when the cutter 636 is at the pre-cut position S1 and the connecting bar 641 is upright, there still is a small angle between the elongated slot 641b and the axial line L1 to make the elongated slot 641b oblique.

Figure 9:
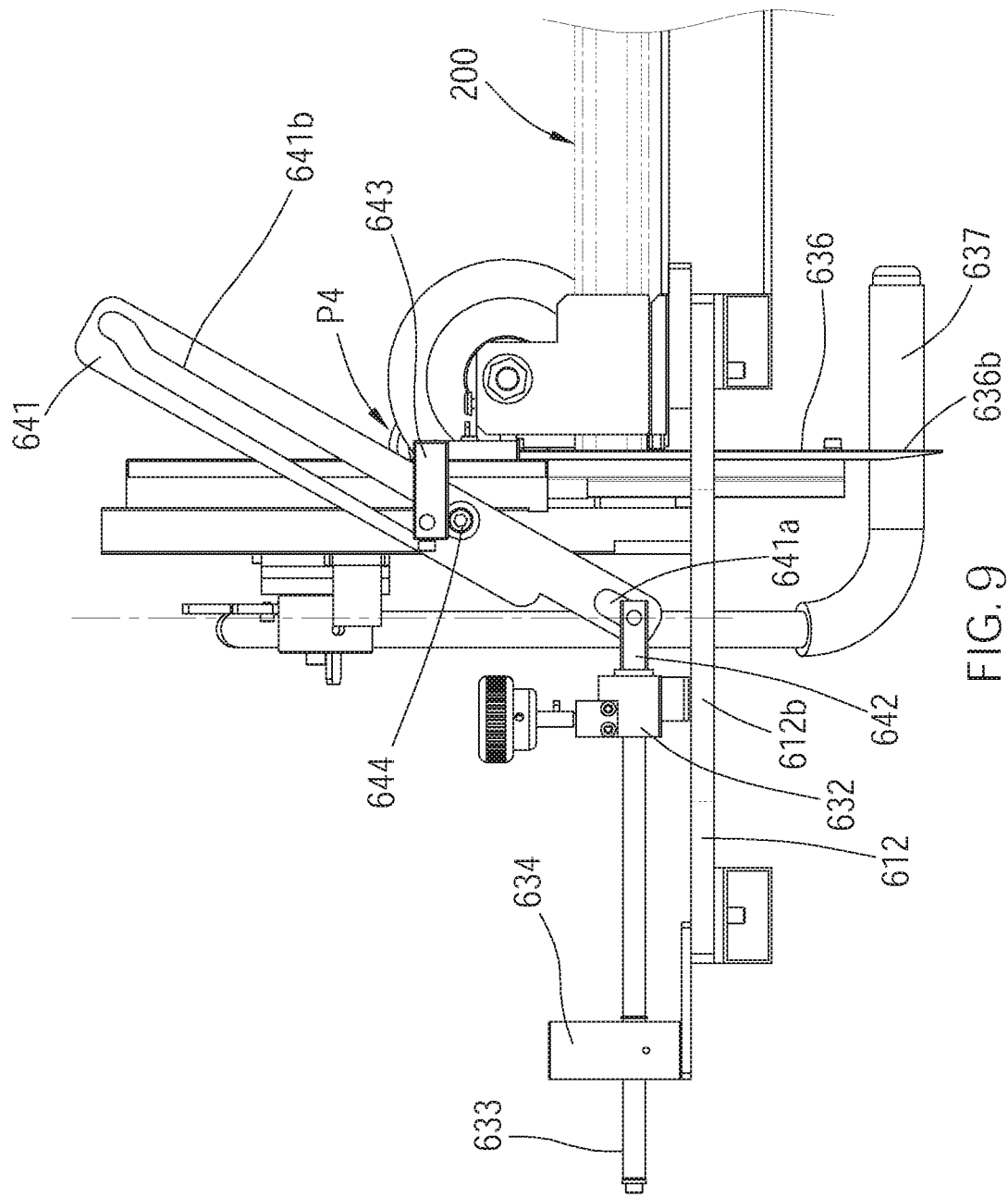
FIG. 9 is a right view of FIG. 3, showing the movable block at the fourth position.

The movable block 643 is fixed to the guiding block 638, and has a portion received in the elongated slot 641b. While the control bar 637 is swung between the first position P1 and the second position P2 to move the cutter 636 between the pre-cut position S1 and the post-cut position S2, it will move the movable block 643 along the elongated slot 641b between a third position P3 (FIG. 6) and a fourth position (FIG. 9). For the movable block 643 at the third position P3, the connecting bar 641 moves the stopping blocks 632 approaching the cutter 636. At this time, the stopping blocks 632 are a stopper of the window covering 200, which is, the window covering 200 has an end abutting against the stopping blocks 632 for positioning. On the contrary, when the movable block 643 is moved toward the fourth position P4, with the design of the oblique elongated slot 641a, it could push the connecting bar 641 outwards to move the stopping blocks 632 away from the cutter 636. At this time, the discharging opening 612b under a space between the guiding surface 614a of the guiding board 614 and the stopping blocks 632 gradually enlarges. As a result, the waste part of the window covering 200 after the cutting task would automatically drop off the machine base 610 through the discharging opening 612b. On the other hand, the stopping blocks 632 will return to wait for the next window covering when the movable block 643 is moved back to the third position P3.

Figure 10:
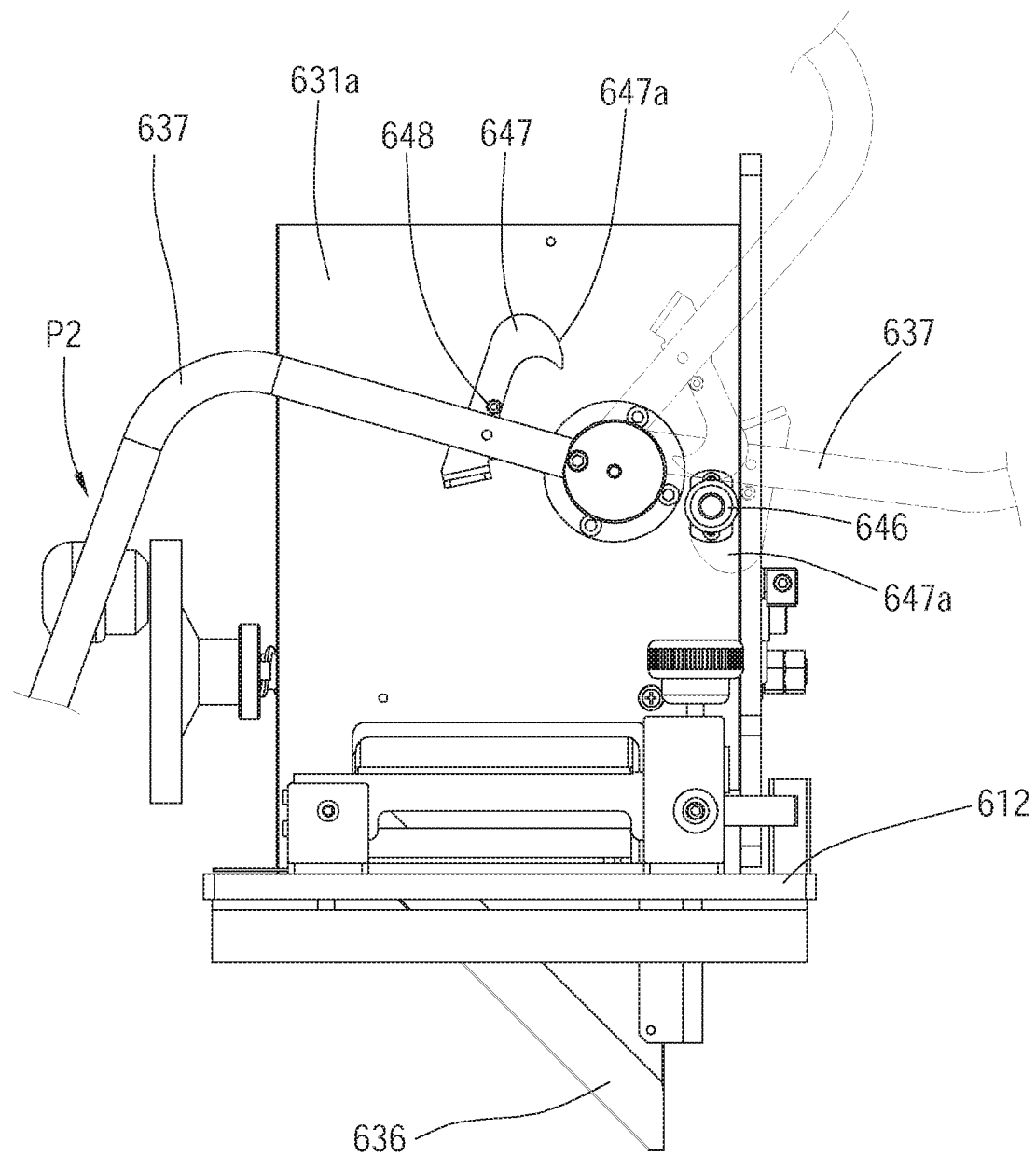
FIG. 10 is a front view of FIG. 3, showing the relationship of the locker and the positioning post.

The cutting device 630 further includes a positioning post 646 and a locker 647. As shown in FIG. 1, FIG. 8, and FIG. 10, the positioning post 646 is fixed to the back board 631a of the frame 631, and the locker 647 is an L-shaped plate pivoted on the control bar 637 to be operated. The locker 647 has a hook 647a at an end thereof, and the hook 647a has a round edge. The hook 647a of the locker 647 engages the positioning post 646 when the control bar 637 is moved to the first position P1 (FIG. 4) to prevent the control bar 637 from being moved unexpectedly. On the contrary, if the locker 647 is moved to disengage the hook 647a with the positioning post 646, the control bar 637 is free to be moved to the second position P2 (FIG. 8 and FIG. 10) that will move the cutter 636 downwards for the cutting task.

The locker 647 is fixed with a stopping member 648, which is a bolt for example in the present invention, to separate the control bar 638 from the hook 647a of the locker 647. As a result, when the control bar 637 is swinging toward the first position P1 from the second position P2 (FIG. 10), the hook 647a will not touch the control bar 637, and keeps in a suspended status. It would makes the round edge of the hook 647a abut against the positioning post 646. While the control bar 637 continually approaches the first position, it will move the locker 647 to make the hook 647a automatically engage the positioning post 646 because of gravity. As a result, the control bar 637 is locked automatically when the control bar 637 arrives at the first position P1.

In conclusion, the cutting machine 100 provides the blade edge 636a of the cutter 636 oblique to the sustaining face 613a that would make the window covering have a nice cutting facet. For the sustaining face 613a of the non-rigid pad 613 softer than the blade edge 636a of the cutter 636, it could protect the blade edge 636a and elongate the life of the cutter 636. The unique clamping device 620 of the present invention provides a consistent pressure to all kinds of the window coverings. It could avoid the bad effect while the pressure to the window coverings is too large or too small. The cutting machine 100 of the present invention further provides the safe design, which avoid the cutter from be activated unexpectedly, and auto-discharging function. It is a nice design.

Figure 11:
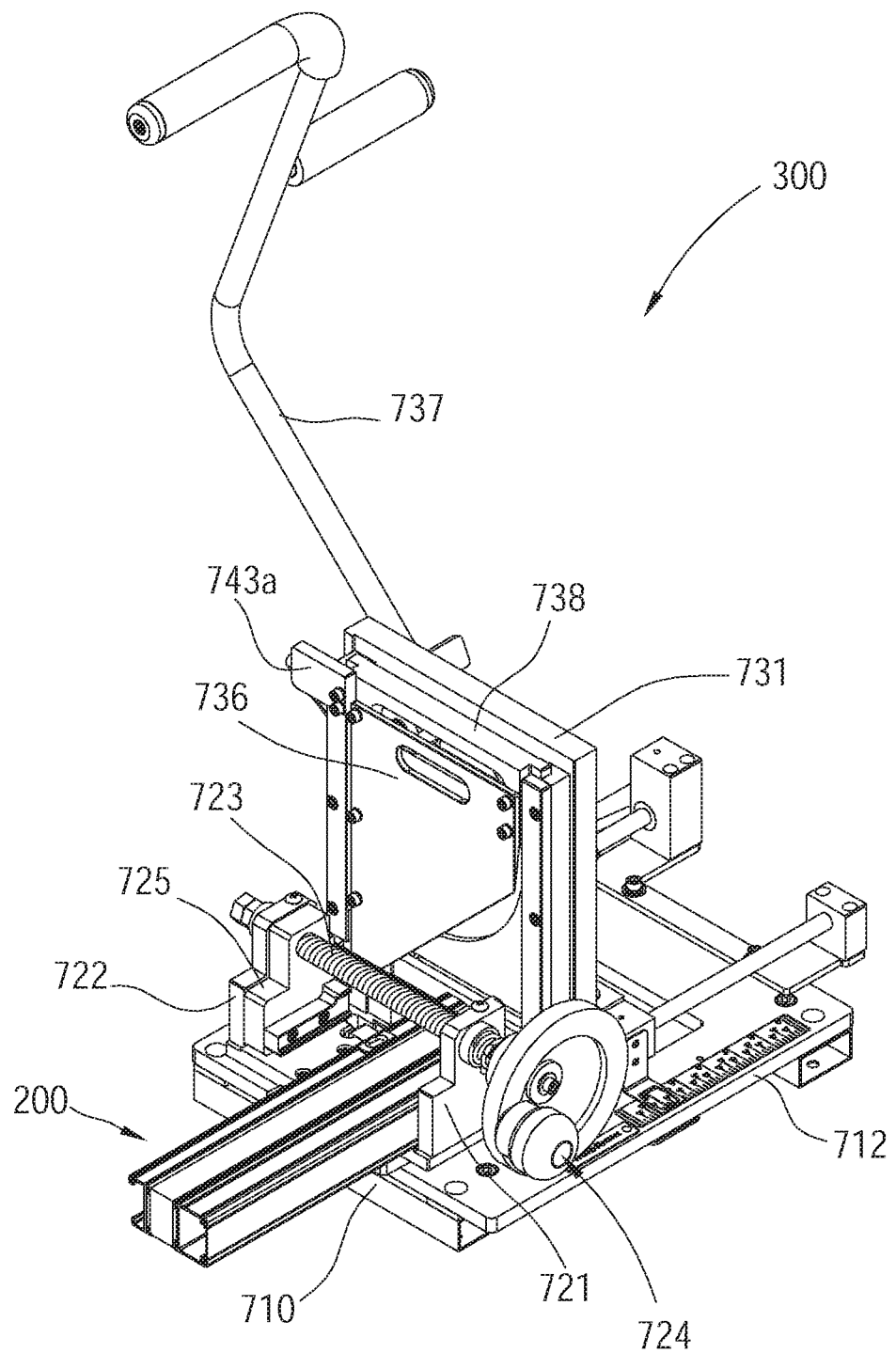
FIG. 11 is a perspective view of a cutting machine of another preferred embodiment according to the present invention.

Also referring to FIG. 11 to FIG. 14, a cutting machine 300 of another preferred embodiment according to the present invention is disclosed. As shown in FIG. 11, the cutting machine 300 of the current embodiment includes a machine base 710, a clamping device, and a cutting device. The structure of the cutting machine 300 is similar to that of the cutting machine 100 of the aforementioned embodiment, except that the cutting device includes a connecting bar 741 which is horizontally arranged on the machine base 710; the connecting bar 741 will be described in details below.

Figure 12:
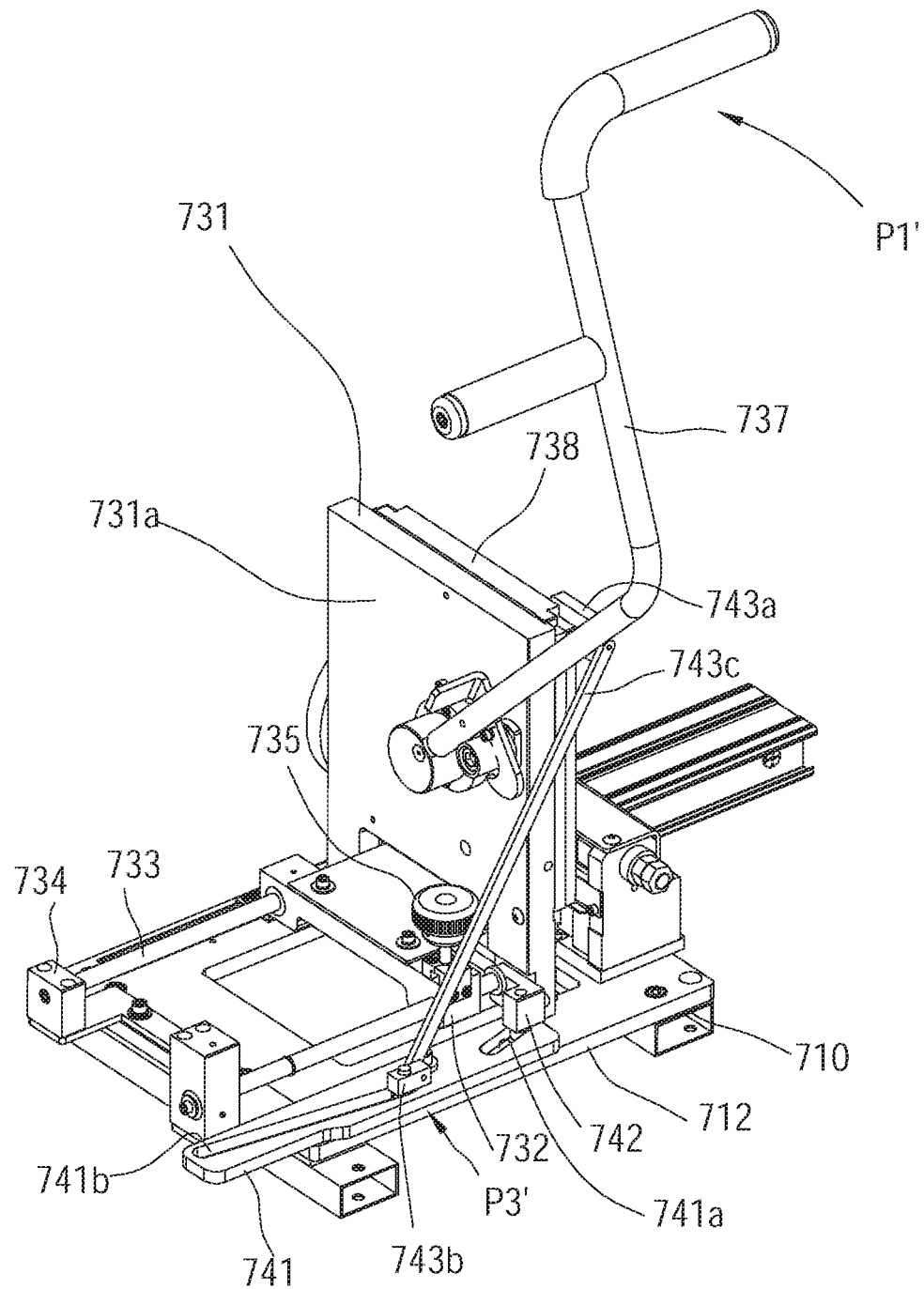
FIG. 12 is another perspective view of the cutting machine of FIG. 11, showing the control bar at the first position and the connecting bar at the third position.
Figure 13:
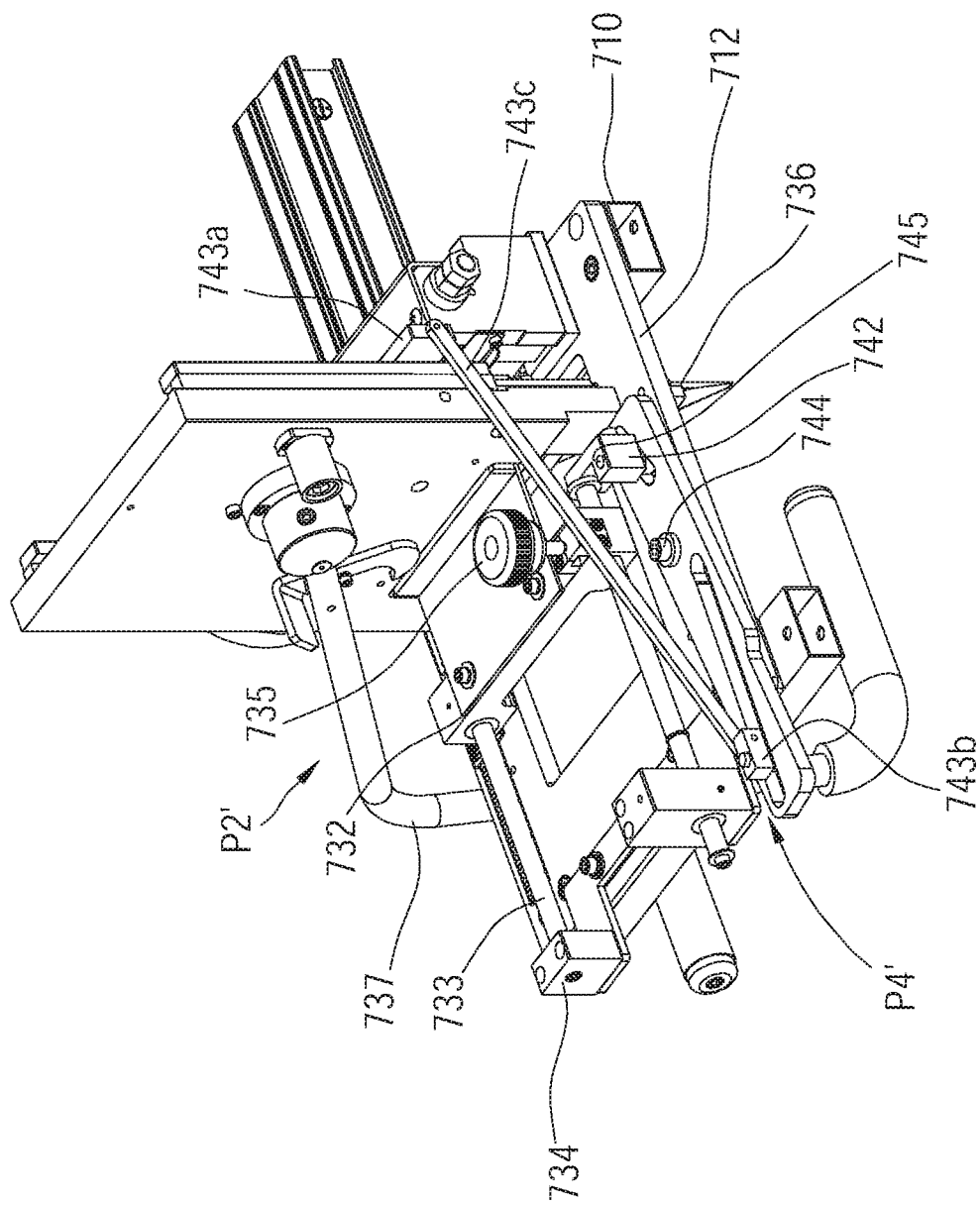
FIG. 13 is still another perspective view of the cutting machine of FIG. 11, showing the control bar at the second position and the connecting bar at the fourth position.

Wherein, the machine base 710 has an identical structure with the machine base 610, including a rigid board 712 and a sustaining face on a top side thereof to sustain the window covering 200. Similarly, the clamping device includes two fixed bases 721, 722, a screw rod 723, an operating wheel 724, and a clamping block 725. FIG. 12 is a perspective view of the cutting machine 300 as viewed from an angle different from that of FIG. 11, showing the cutting machine 300 is in a pre-cut state; FIG. 13 is a perspective view of the cutting machine 300, showing the cutting machine 300 is in a post-cut state. As shown in FIG. 12, the cutting device includes a frame 731 and a stopping block 732. The frame 731 is vertically mounted on the rigid board 712 between the clamping device and the stopping block 732. The stopping block 732 is fixed to two bars 733, and each of the bars 733 passes through a fixed block 734, whereby the stopping block 732 could reciprocate along the machine base 710 as being moved relative to the frame 731. A knob 735 is provided to be operated to lock and unlock the stopping block 732, whereby to position the stopping block 732 at any desired positions on the bars 733.

The cutting device further includes a cutter 736 and a control bar 737. The cutter 736 is fixed to a guiding block 738, and the guiding block 738 engages with the frame 731 in a reciprocating manner. The control bar 737 has an end pivoted on a back board 731a of the frame 731. The control bar 737 is adapted to be operated and swung between a first position P1' (as shown in FIG. 12) and a second position P2' (as shown in FIG. 13) to move the cutter 736 in a vertical direction.

Figure 14:
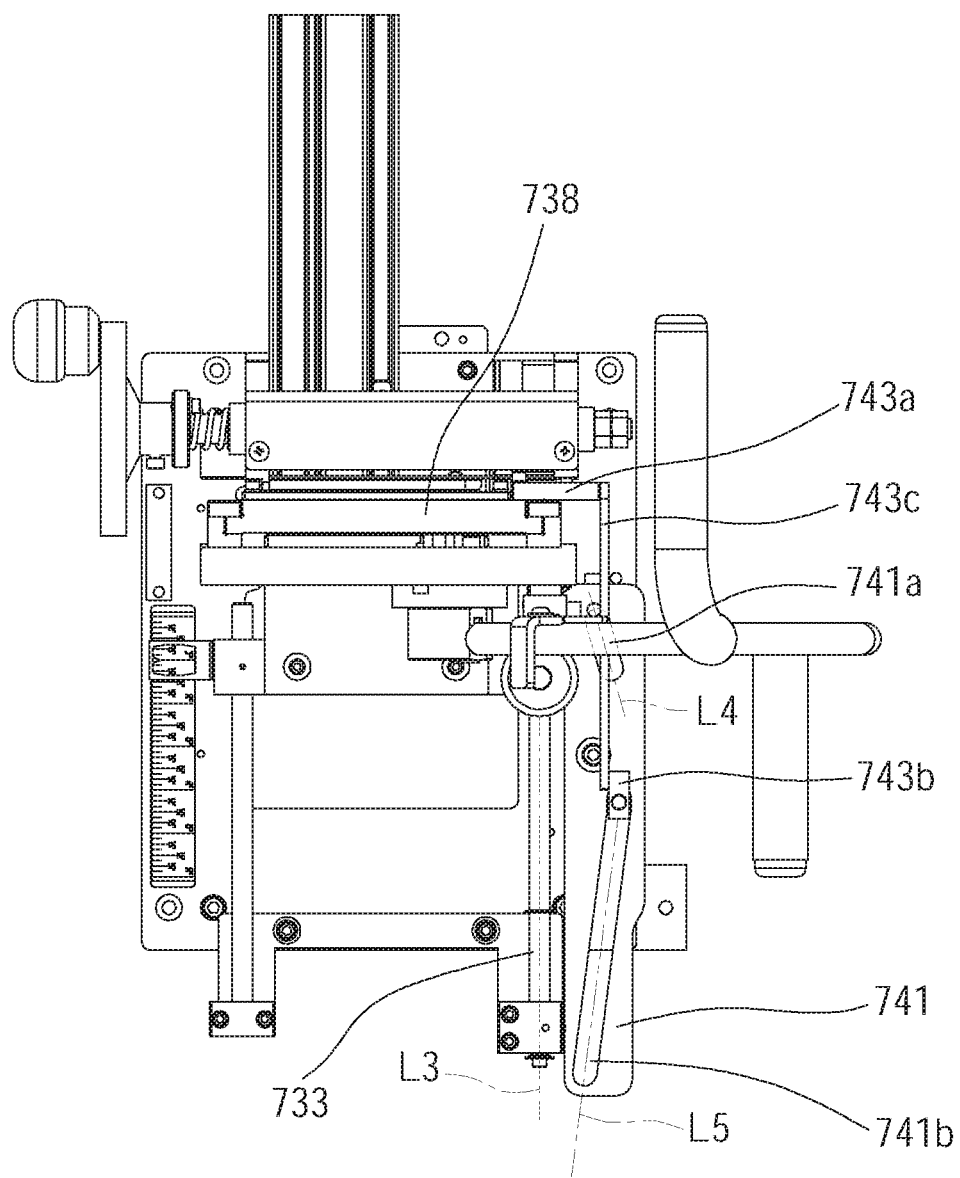
FIG. 14 is a partial top view of FIG. 12, showing the slot and the elongated slot being oblique to the longitudinal direction of the bar.

The cutting device of the cutting machine 300 further includes the connecting bar 741, a connecting block 742, a first moveable block 743a, a second movable block 743b, and a movable bar 743c, which connects the first movable block 743a and the second movable block 743b. Wherein, the connecting bar 741 is disposed on a top surface of the rigid board 712, and is pivotally connected to the rigid board 712 by a pin 744 (as shown in FIG. 13), whereby the connecting bar 741 could pivotally swing relative to the rigid board 712. The connecting bar 741 has a slot 741a and an elongated slot 741b, which are respectively formed on two opposite ends of the connecting bar 741, wherein the slot 741a and the elongated slot 71 are both oblique to a longitudinal direction L3 of each of the bars 733 when the cutting machine 300 is under a pre-cut state. In more details, as shown in FIG. 14, when the control bar 737 is at a first position P1', the angle included between the longitudinal direction L3 of the closer bar 733 and a center line L4 of the slot 741a and the angle included between the longitudinal direction L3 of the closer bar 733 and a center line L5 of the elongated slot 741b are both small. The first movable block 743a is fixed to the guiding block 738, and is pivotally connected to one end of the movable bar 743c, while another end of the movable bar 743c is pivotally connected to the second movable block 743b, which has a portion received in the elongated slot 741b. Whereby, the first movable block 743a and the second movable block 743b are linked to each other via the movable bar 743c. Since the first movable block 743a is fixed to the guiding block 738, the first movable block 743a could be moved along with the guiding block 738. In addition, the connecting block 742, which engages the slot 741a of the connecting bar 741 via a rod 745 longitudinally connected thereto, has an end fixed to the adjacent bar 733. Since the bars 733 have the stopping block 732 provided thereon, the connecting bar 741 is linked to the stopping block 732 through the connecting block 742.

When the control bar 737 is swung between the first position P1' and the second position P2' to move a cutter 736 between a pre-cut position and a post-cut position, it would move the first movable block 743a up and down, which drives the second movable block 743b to move along the elongated slot 741b between a third position P3'(as shown in FIG. 12) and a fourth position P4'(as shown in FIG. 13). When the second movable block 743b is at the third position P3', the connecting bar 741 moves the connecting block 742 and the stopping block 732 to approach the cutter 736. On the contrary, when the second movable block 743b is moved toward the fourth position P4', with the oblique designed elongated slot 741a, the connecting bar 741 would be pushed outwards to move the connecting block 742 and the stopping block 732 away from the cutter 736. With the aforementioned design, the connecting bar 741 could be arranged horizontally and pivotally swing on the rigid board 712, thereby providing a better support and more stable operation for the connecting bar 741.

It must be pointed out that the embodiments described above are only some preferred embodiments of the present invention. All equivalent structures which employ the concepts disclosed in this specification and the appended claims should fall within the scope of the present invention.

What is claimed is:

1. A cutting machine for cutting a window covering, comprising:
   a machine base having a sustaining face for putting the window covering thereon; and
   a cutting device provided on the machined base, wherein the cutting device includes:
   a frame provided on the machine base;
   a cutter movably disposed in the frame;
   a control bar pivoted on the frame, wherein the control bar is controllable to pivotally swing between a first position and a second position; the cutter is adapted to be moved up and down as being driven by the control bar;
   a movable block provided to be moved along with the cutter between a third position and a fourth position when the control bar pivotally swings between the first position and the second position;

a stopping block movably provided on the machine base, and adapted to abut against one end of the window covering to be cut; and a connecting bar provided on the machine base, and adapted to be pivotally swung as being moved by the movable block, wherein, the stopping block is adapted to be driven by the connecting bar to reciprocate along the machine base; the stopping block is driven to move toward the cutter by the connecting bar while the movable block is being moved to the third position; the stopping block is driven to move away from the cutter by the connecting bar while the movable block is being moved to the fourth position.

2. The cutting machine of claim 1, wherein the cutting device further comprises an elongated bar disposed corresponding to the sustaining face; the stopping block is movably mounted on the elongated bar; one end of the elongated bar is pivotally connected to the connecting bar, while another end of the elongated bar extends in a direction away from the sustaining face and passes through a fixed block protruding from the machine base; the connecting bar drives the elongated bar to reciprocate relative to the fixed block, which makes the stopping block reciprocate along with the elongated bar along the machine base when the connecting bar is driven by the movable block to pivotally swing.

3. The cutting machine of claim 2, wherein the connecting bar is pivotally connected to the frame and is adapted to be pivotally swung relative to the frame as being driven by the movable block.

4. The cutting machine of claim 3, wherein the cutting device further comprises a knob adapted to fix the stopping block at a desired position on the elongated bar.

5. The cutting machine of claim 2, wherein the connecting bar comprises an elongated slot; the movable block has a portion received in the elongated slot to be moved along the elongated slot between the third position and the fourth position.

6. The cutting machine of claim 5, wherein the elongated slot is oblique to an axial line, which is perpendicular to the sustaining face.

7. The cutting machine of claim 2, wherein the connecting bar is pivotally connected to a rigid board of the machine base and adapted to be pivotally swung relative to the rigid board as being driven by the movable block.

8. The cutting machine of claim 7, wherein the cutting device further includes another movable block and a movable bar, wherein the another movable block moves along with the cutter, and is pivotally connected to one end of the movable bar, while another end of the movable bar is pivotally connected to the movable block; the movable block has a portion received in an elongated slot of the connecting bar to be moved along the elongated slot between the third position and the fourth position.

9. The cutting machine of claim 8, wherein the cutting device further comprises a knob adapted to fix the stopping block at a desired position on the elongated bar.

10. The cutting machine of claim 8, wherein the elongated slot is oblique to a longitudinal direction of the elongated bar.

11. The cutting machine of claim 1, wherein the cutting device further comprises a positioning post and a locker; the positioning post is fixed to the frame; the locker pivots to the control bar and includes a hook; when the control bar is at the first position, the hook of the locker could engage the positioning post; when the hook of the locker disengages from the positioning post, the control bar could be operated to pivotally swing to the second position.

12. The cutting machine of claim 11, wherein the cutting device further comprises a stopping member fixed on the locker and adapted to separate the hook of the locker from the control bar.

13. The cutting machine of claim 12, wherein the hook of the locker comprises a round edge; when the control bar approaches the first position while being moved from the second position to the first position, the round edge of the hook abuts against the positioning post to move the locker off, and then the locker automatically moves back to engage the positioning post because of gravity.

* * * * *